US012566032B2

(12) United States Patent
Yu et al.

(10) Patent No.: US 12,566,032 B2
(45) Date of Patent: Mar. 3, 2026

(54) VAPOR CHAMBER ASSEMBLY

(71) Applicant: SIGNIFY HOLDING B.V., Eindhoven (NL)

(72) Inventors: Jiang Hong Yu, Best (NL); Derk Tiekink, Mierlo (NL); Genevieve Therese Martin, Udenhout (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 434 days.

(21) Appl. No.: 18/009,401

(22) PCT Filed: Jun. 8, 2021

(86) PCT No.: PCT/EP2021/065218
§ 371 (c)(1),
(2) Date: Dec. 9, 2022

(87) PCT Pub. No.: WO2021/249970
PCT Pub. Date: Dec. 16, 2021

(65) Prior Publication Data
US 2023/0258411 A1 Aug. 17, 2023

(30) Foreign Application Priority Data
Jun. 11, 2020 (EP) .................................... 20179417

(51) Int. Cl.
*F28D 15/02* (2006.01)
*F21V 29/51* (2015.01)
*F28D 9/00* (2006.01)
*F21Y 115/10* (2016.01)
*F28D 21/00* (2006.01)

(52) U.S. Cl.
CPC .......... *F28D 15/0233* (2013.01); *F21V 29/51* (2015.01); *F28D 9/0062* (2013.01); *F21Y 2115/10* (2016.08); *F28D 2021/0019* (2013.01)

(58) Field of Classification Search
CPC .................................................. F28D 15/0233
See application file for complete search history.

(56) References Cited

U.S. PATENT DOCUMENTS 6,504,721 B1 1/2003 Watwe et al.
10,712,102 B2 * 7/2020 Takken .................... F28F 3/04
2009/0242169 A1 10/2009 Meyer, IV et al.
2010/0226138 A1 * 9/2010 Lin ...................... F21V 29/717 362/373
2010/0265727 A1 10/2010 Liu
(Continued)

FOREIGN PATENT DOCUMENTS

DE 202014000065 U1 1/2014
EP 0971407 A1 1/2000
(Continued)

*Primary Examiner* — Devon Lane

(57) ABSTRACT

The invention provides a vapor chamber assembly (1000) comprising two sections (1200) and one or more vapor chamber elements (100), wherein each section (1200) comprises at least part of the one or more vapor chamber elements (100), wherein each vapor chamber element (100) comprises a vapor chamber (200) at least partly defined by two parallel configured plate parts (211, 221), wherein the two sections (1200) define a bend (1100), wherein the bend (1100) has a bend angle αb, wherein $0° \leq \alpha_b < 180°$.

10 Claims, 7 Drawing Sheets

(56) References Cited

U.S. PATENT DOCUMENTS

| | | | | |
|---|---|---|---|---|
| 2011/0174474 | A1 | 7/2011 | Liu et al. | |
| 2012/0168435 | A1 | 7/2012 | Chen et al. | |
| 2012/0305222 | A1* | 12/2012 | Yang | F28D 15/046 29/890.03 |
| 2013/0223064 | A1 | 8/2013 | Lee et al. | |
| 2013/0306184 | A1* | 11/2013 | Prischak | F24F 13/00 138/119 |
| 2018/0284856 | A1* | 10/2018 | Shah | G06F 1/1616 |
| 2019/0204018 | A1 | 7/2019 | Zhang et al. | |

FOREIGN PATENT DOCUMENTS

| | | | | |
|---|---|---|---|---|
| EP | 1681527 | A1 | 7/2006 | |
| EP | 2770253 | A1 * | 8/2014 | F21V 29/006 |
| JP | 2002022381 | A | 1/2002 | |
| WO | 2020026908 | A1 | 2/2020 | |

* cited by examiner

VAPOR CHAMBER ASSEMBLY

CROSS-REFERENCE TO PRIOR APPLICATIONS

This application is the U.S. National Phase application under 35 U.S.C. § 371 of International Application No. PCT/EP2021/065218, filed on Jun. 8, 2021, which claims the benefit of European Patent Application No. 20179417.9, filed on Jun. 11, 2020. These applications are hereby incorporated by reference herein.

FIELD OF THE INVENTION

The invention relates to a vapor chamber assembly. The invention further relates to a vapor chamber segment. The invention further relates to a device comprising the vapor chamber assembly.

BACKGROUND OF THE INVENTION

Vapor chambers are known in the art. For instance, US2010226138A1 describes a road lamp holder structure includes a lamp guard, an LED unit installed at the bottom of the lamp guard, and a heat dissipating device installed in lamp guard and having a base, a vapor chamber and two heat dissipating elements attached to the LED unit. The vapor chamber includes a heated section attached onto the base, two heat transmitting sections bent and extended upward from both sides of the heated section respectively, a condensing section bent and extended laterally from each of the two heat transmitting sections, two heat dissipating elements having a heated base, and heat dissipating fins disposed on the heated base. The two heated bases are attached onto external sides of the two heat transmitting sections of the vapor chamber respectively, and the two condensing sections of the vapor chamber are attached to the internal periphery of the top of the lamp guard.

SUMMARY OF THE INVENTION

Compactness of electronic components may be becoming increasingly important, for example in the context of LED lighting. With the requirements for miniaturization, new technologies and solutions may be desired for the next generations of electronic components.

The prior art may describe electronic components, such as a driver, in a housing, wherein otherwise empty space in the housing is filled up with thermal interface materials However, thermal interface materials, such as polymer-based composites and graphite type thermal interface materials, may typically have a maximum thermal conductivity less than 400 W/mK. Further, it appears that vapor chambers with thermal conductivities in the range of 15000-27000 W/mK may be possible. However, the vapor chambers may not easily be suitable for device miniaturization. In particular, prior art vapor chambers may be restricted to either a planar configuration, at which maximum heat exchange may be achieved, or to a bent configuration with a bending radius such as, for example, 10 mm, which may block device miniaturization. In particular, prior art vapor chambers may collapse when bent at a smaller bending radius suitable for device miniaturization.

Hence, it is an aspect of the invention to provide an alternative vapor chamber, which preferably further at least partly obviates one or more of above-described drawbacks. The present invention may have as object to overcome or ameliorate at least one of the disadvantages of the prior art, or to provide a useful alternative.

Hence, in a first aspect the invention may provide a (bent) vapor chamber assembly. The vapor chamber assembly may comprise two sections. The vapor chamber assembly may further comprise one or more vapor chamber elements. In embodiments, each section may comprise at least part of the one or more vapor chamber elements. Further, each vapor chamber element may comprise a vapor chamber at least partly defined by two parallel configured plate parts. In embodiments, the two sections may define a bend, especially arranged between the two sections, wherein the bend has a bend angle $\alpha_b$, especially wherein $0° \leq \alpha_b < 180°$.

The vapor chamber assembly of the invention may provide the benefit that vapor chambers elements may be provided in a manner suitable for device miniaturization. In particular, vapor chamber assemblies may be provided that provide vapor chamber elements at a sharp angle or with a bend having a small bending radius. In particular, the invention provides embodiments wherein a (bent) vapor chamber assembly is obtained without vapor chamber collapse.

The term "sharp angle" may herein especially refer to the vapor chamber element being provided by two adjoining vapor chamber sections, rather than by the bending of an element, such as the bending of a base plate (see below). Hence, in such embodiments, the "bend" may be an instantaneous rather than a smooth transition between adjacent sections.

In specific embodiments, the vapor chamber assembly comprises two sections and one or more vapor chamber elements, wherein each section comprises at least part of the one or more vapor chamber elements, wherein each vapor chamber element comprises a vapor chamber at least partly defined by two parallel configured plate parts, wherein the two sections define a bend, wherein the bend has a bend angle $\alpha_b$, wherein $0° \leq \alpha_b < 180°$.

Hence, the invention may provide a vapor chamber assembly, especially a bent vapor chamber assembly. The term "vapor chamber assembly" may herein especially refer to a physically connected unit comprising at least one vapor chamber element.

In embodiments, the vapor chamber assembly may comprise (at least) two sections, such as (at least) three sections, especially (at least) 4 sections (see below). The sections may comprise non-overlapping parts of the vapor chamber assembly. In particular, the vapor chamber assembly may be divided into the (at least) two sections, i.e., together the sections may comprise the (entire) vapor chamber assembly. In further embodiments, the vapor chamber assembly may be divided (or: "sectioned") into the (at least) two sections along a longitudinal dimension of the vapor chamber assembly.

In embodiments, each section may have a section plane, especially wherein none of the section planes (of different sections) are overlapping. In further embodiments, the section planes (of the different sections) are arranged at an angle $\alpha_p$, wherein $0° < \alpha_p < 180°$, i.e., the section planes of the different sections are not arranged in parallel.

In embodiments, the vapor chamber assembly may further comprise one or more vapor chamber elements. Vapor chamber elements are known in the art and may be based on essentially the same principle as heat pipes (which are also known in the art). Both systems are known as "two-phase devices". Both two-phase devices may include a wick structure (sintered powder, mesh screens, and/or grooves) applied to the inside wall(s) of an enclosure (tube or planar shape).

Liquid, such as water (e.g. for a copper device) or acetone (e.g. for an aluminum device), may be added to the device and the device may be vacuum sealed. The wick may distribute the liquid throughout the device. However, when heat is applied to one area of the two-phase device, the liquid turns to vapor and moves to an area of lower pressure where it cools and returns to liquid form whereupon it moves back to the heat source by virtue of capillary action (through the wick). A common wick structure may be a sintered wick type because it offers a high degree of versatility in terms of power handling capacity and ability to work against gravity. Mesh screen wicks may allow the heat pipe or vapor chamber to be thinner relative to a sintered wick. Also, a grooved wick may be applied. The grooves may act as an internal fin structure aiding in the evaporation and condensation. A difference between the heat pipe and the vapor chamber may be that the heat pipe may have an essentially rod-shaped shape, whereas the vapor chamber may in general include two essentially planar plates at a relative short distance (such as up to 5 mm. Further, for the vapor chamber the hot spot may relatively freely be chosen, whereas for a heat pipe there is a hot and cold side.

The vapor chamber element may comprise a vapor chamber at least partly defined by two parallel configured plates, i.e., in embodiments, the vapor chamber element may comprise a first plate and a second plate, especially with a vapor chamber in between. The first plate and the second plate may especially be arranged in parallel. Hence, in embodiments the vapor chamber may be defined by at least a first plate and a second plate having an average plate distance equal to the first height H1, i.e., the first plate and the second plate may define the first height H1. At the edges of the plates, the plates may be welded together to provide a closed chamber. The plates may also define, together with one or more edges, the vapor chamber. In embodiments, over a substantial part of the first plate and a substantial part of the second plate, the plates may be configured parallel. For instance, over at least 50%, such as at least 80%, like at least 90% of an area of the first plate, and over at least 50%, such as at least 80%, like at least 90% of an area of the second plate, the plates may be configured parallel. Hence, over a substantial part of the first plate and a substantial part of the second plate, the distance between the plates may essentially not vary. The first plate and the second plate may especially approximate a (same) rectangular shape, such as a rounded rectangular shape. In particular, the term "parallel" with respect to the parallel configured plates may herein refer to the two plates having essentially the same (closest) distance from one another at over a substantial parts of the plates. Hence, the two plates may, for example, be bent, especially with the same radius of curvature, and still be considered parallel.

Materials of the first plate and the second plate may be selected from the group consisting of copper, stainless steel, aluminum and titanium. Hence, in embodiments, the first plate may comprise a material selected from the group comprising copper, stainless steel, aluminum, and titanium. In further embodiments, the second plate may comprise a material selected from the group comprising copper, stainless steel, aluminum, and titanium. Especially, both plates may consist of the same material. In specific embodiments, also material combinations may be applied, such as alloys.

In further embodiments, the first plate and the second plate may be shaped from a single piece (of material). In particular, a single piece (of material) may have been bent to provide the first plate and the second plate, especially separated at a distance H1.

In further embodiments, the first plate and the second plate may be two separate plates. In particular, the first plate and the second plate may be welded together at their edges to provide a closed chamber. In further embodiments, the vapor chamber element may further comprise a plurality of side plates, bridging the first plate (also: "top plate") and the second plate (also: "bottom plate"), wherein the chamber is arranged in between the first plate, the second plate and the plurality of side plates. The vapor chamber element, especially the chamber defined by the plates, may have a shape approximating a cuboid, especially a bar, such as a cuboid with rounded (internal) corners.

In embodiments, the chamber may have a first height (H1), especially the average distance between the first plate and the second plate. In particular, as the first plate and the second plate may be arranged essentially in parallel, the first height H1 may be essentially constant throughout the chamber. In specific embodiments, the first height (H1) may be selected from the range of 50 μm-5 mm. In embodiments, the first height may be at maximum 1 mm. The first height may even be equal to or smaller than 0.4 mm, e.g. in the range of 100-400 μm, like 200-400 μm, such as at least 250 μm.

The chamber may have a (first) height as defined by the (average) distance between the first plate and the second plate. The chamber may further have a (first) length (L1) and a (first) width (W1) perpendicular to the first height (H1). Hence, in embodiments each section may (also) have the (first) width (W1).

The vapor chamber element may comprise a first chamber end and a second chamber end defining the first length (L1). In general, the chamber will have a length and a width that are substantially larger than the height. Further, in general, the chamber will have a cross-section which is essentially rectangular. The vapor chamber element, especially the chamber, may have an axis of elongation. The axis of elongation may especially be an axis along which the length of the vapor chamber may be defined. Hence, the vapor chamber element may have an elongated shape having a longitudinal axis, especially wherein the first axis (A) is the longitudinal axis (of the vapor chamber element).

Further, in general the height may be much smaller than the length and/or width of the chamber. Hence, in specific embodiments the first length (L1) and the first height (H1) may have a ratio selected from the range of $L1/H1 \geq 10$, such as $\geq 20$, like selected from the range of 10-10,000. Alternatively or additionally, in specific embodiments the first width (W1) and the first height (H1) may have a ratio selected from the range of $W1/H1 \geq 10$, such as $\geq 20$, like selected from the range of 10-10,000. In further embodiments, the first axis (A) has a first length (L1) defining a length of the vapor chamber element, wherein the vapor chamber element has a first width (W1) (perpendicular to the first axis (A)), wherein $0.2 \leq L1/W1 \leq 5$.

In embodiments, the first length L1 may e.g. be selected from the range of 1-50 cm, such as 2-40 cm, like selected from the range of 2-20 cm, such as in the range of 4-15 cm, e.g. 5-12 cm. Likewise, this may apply to the first width. In general, in embodiments, the first width may be smaller than the first length.

In embodiments, the vapor chamber may have a chamber volume of at least about 1 $mm^3$, even more especially at least about 1 $cm^3$. In embodiments, the chamber volume may be at maximum about 25 $cm^3$, even more especially at maximum about 10 $cm^3$.

In embodiments, the first plate and the second plate may (respectively) have a first thickness ($d_1$) and a second thickness ($d_2$) independently selected from the range of 50-5000 μm, such as 100-2000 μm, like especially 300-2000 μm. The phrase "independently selected" and similar phrases may refer to embodiments wherein for the relevant elements the same value of the parameter is chosen, i.e. in these embodiments both plates may have the same thickness, but may also refer to embodiments wherein for the relevant elements different values of the parameter are chosen, i.e. in these embodiments both plates may have a thickness selected from the indicated range, but they may have different thicknesses. Further, in embodiments the first and second thickness(es) may also vary over the first plate and/or the second plate.

The thicknesses of the first plate and the second plate and the space between the plates may essentially define the thickness of the vapor chamber elements. Hence, in embodiments, the vapor chamber element may have an element thickness $d_e$, wherein $d_e = d_1 + d_2 + H1$. In particular, the element thickness $d_e$ may be essentially the same as the segment thickness $d_s$ (see below).

In further embodiments, the two sections may define a bend, especially arranged between the two sections, i.e., at a border (directly) between the two (adjacent) sections. The bend may have a bend angle $\alpha_b$, which may especially be the smallest angle between the two sections, especially wherein $0° \leq \alpha_b < 180°$. In particular, the two (adjacent) sections have different section planes, i.e., the bend angle $\alpha_b < 180°$, or the section planes may be arranged at a distance to one another. Hence, in embodiments, the two (adjacent) sections may be arranged in parallel, wherein the bend angle $\alpha_b$ may be (essentially) 0°. In embodiments, the bend angle $\alpha_b$ may especially be at least 5°, such as at least 15°, especially at least 30°, such as at least 45°, especially at least 60°, such as at least 75°. In further embodiments, the bend angle $\alpha_b$ may be at most 175°, such as at most 165°, especially at most 150°, such as at most 135°, especially at most 120°, such as at most 105°. In particular embodiments, the bend angle $\alpha_b$ may be selected from the range of 5°-135°, especially from the range of 80°-100°. The bend angle may especially be about 90°.

In embodiments, the two sections may together define at least part of (a single) one of the one or more vapor chamber elements. In particular, the (single) one (or "shared vapor chamber element") of the one or more vapor chamber elements may be defined by (at least) two sections, such as by three sections. In further embodiments, each of the (at least) two sections may comprise a vapor chamber element part, wherein the vapor chamber element parts (of the two sections) taper towards the bend, and wherein the vapor chamber element parts define at least part of the one of the one or more vapor chamber elements.

Hence, for example, in further specific embodiments, the vapor chamber assembly may comprise (at least) three sections, wherein each two adjacent sections—i.e., a first section with a second section and the second section with a third section—define a bend (between the two adjacent sections, wherein each of three (adjacent) sections comprises a vapor chamber element part, wherein the vapor chamber element parts taper towards the bend, and wherein each of the vapor chamber element parts define at least part of the one of the one or more vapor chamber elements. In such embodiments, the vapor chamber element part of the second section may thus taper towards both bends, whereas the vapor chamber element parts of the first section and of the third section may taper towards a single bend.

In particular, the vapor chamber element parts of two adjacent sections may be abutted at the bend (defined by the two adjacent sections).

The vapor chamber element parts (of two adjacent sections) may especially be arranged (at the bend) such that first plate parts of the vapor chamber element parts are abutted (at the bend) and such that second plate parts of the vapor chamber element parts are abutted (at the bend).

Hence, in further embodiments, the vapor chamber may be at least partly defined by two plates, wherein a first plate of the two plates comprises (at least) two first plate parts abutted at the bend, and wherein a second plate of the two plates comprises (at least) two second plate parts abutted at the bend, especially wherein each of the first plate parts is configured in parallel with (a respective) one of the second plate parts.

In further embodiments, the vapor chamber may be at least partly defined by two plates, wherein a first plate of the two plates consists of a single piece comprising two (or more) first plate parts, and wherein a second plate of the two plates comprises two (or more) second plate parts abutted at the bend, wherein each of the first plate parts is configured in parallel with one of the second plate parts.

In further embodiments, the vapor chamber assembly may comprises a base plate, wherein the vapor chamber assembly comprises a plurality of vapor chambers elements arranged on the base plate, especially along a base plate length (L), wherein two neighboring vapor chambers elements are separated by the bend. In further embodiments, the vapor chamber assembly may comprise three or more vapor chamber elements, wherein two or more sets of neighboring vapor chamber elements may be separated by (respective) bends. Further, two adjacent vapor chambers elements are not necessarily separated by a bend, i.e., a section may comprise a plurality of vapor chamber elements.

In further embodiments, the two neighboring vapor chamber elements may be separated by a bending region of the base plate, wherein the bending region has a bending length $l_b$ along the base plate length (L), wherein $l_b$ is selected from the range of 0.1-40 mm, especially from the range of 0.2-30 mm, such as from the range of 0.5-20 mm, especially from the range of 1-10 mm. In further embodiments, $l_b$ may be selected to be at least 0.1 mm, such as at least 0.2 mm, especially at least 0.5 mm, such as at least 1 mm, especially at least 2 mm, such as at least 5 mm. In further embodiments, $l_b$ may be selected to be at most 40 mm, especially at most 30 mm, such as at most 25 mm, especially at most 20 mm, such as at most 15 mm, especially at most 10 mm. Hence, in specific embodiments $l_b$ is selected from the range of 0.1-20 mm. The bending length $l_b$ may especially correspond to the desired bend angle $\alpha_b$, i.e., the bending length $l_b$ may have been selected (prior to bending) to be suitable for providing the bend angle $\alpha_b$, especially in consideration of the an (average) thickness $d_p$ of the base plate, as well as in consideration of the first height (H1). Herein, the term "bending length $l_b$" especially refers to the length of the bending region.

Hence, in embodiments, the bending section may have a bending length $l_b$ along the base plate length (L). The bending length may especially be selected to be sufficient to provide the bend. The bending length $l_b$ may especially be selected on the basis of the bend that is desired. In particular, the smaller the angle of the desired bend (i.e., the more bending is to be done), the larger the bending length $l_b$ may be to facilitate acquiring the desired bend. Similarly, the larger the thickness $d_p$ of the base plate, the larger the required bending length $l_b$ may need to be to achieve a specific angle. Hence, in embodiments, $l_b \geq \pi^*(r_b+d_p)^*(180-\alpha_b)/180$, wherein $r_b$ is the bending radius, and wherein $\alpha_b$ is the bend angle. As will be known to the person skilled in the art, the neutral factor of the material may also affect the bending length needed to provide a desired bend. Hence, in further embodiments, $l_b \geq \pi^*(r_b+(K^*d_p))^*(180-\alpha_b)/180$, wherein K is the neutral factor of the material. For thin plates, the influence of the neutral factor may generally be minor.

The bending length $l_b$ may especially be determined at the center of the base plate with regards to thickness, i.e., at a thickness of $0.5^*d_p$.

In embodiments, the base plate may comprise a thinned region, especially a thinned region configured for providing a bend. Hence, the bending region may comprise the thinned region. In embodiments, the thinned region comprises a groove. In embodiments, the length of the groove may be perpendicular to the length L of the base plate. Yet further, in embodiments the length of the groove may be perpendicular to an axis of elongation of a vapor chamber.

In further embodiments, the base plate may have a thickness $d_p$, especially an average thickness, or especially a median thickness, especially wherein $d_p$ is selected from the range of 0.05-2 mm, such as from the range of 0.1-1.5 mm.

In further embodiments the bending region may comprise a thinned region having a (smallest) thickness dr, especially wherein $0.1 \leq d_T/d_p \leq 0.9$. In further embodiments, $d_T/d_p \geq 0.1$, especially $d_T/d_p \geq 0.2$, such as $d_T/d_p \geq 0.3$, especially $d_T/d_p \geq 0.4$, such as $d_T/d_p \geq 0.5$. In further embodiments, $d_T/d_p \leq 0.9$, such as $d_T/d_p \leq 0.8$, especially $d_T/d_p \leq 0.7$, such as $d_T/d_p \leq 0.6$, especially $d_T/d_p \leq 0.5$, such as $d_T/d_p \leq 0.4$, especially $d_T/d_p \leq 0.3$. The material of the base plate may be selected based on multiple criteria, such as the suitability to provide a thin plate with a suitable mechanical strength, and such as a good thermal conductivity. Hence, for example, the base plate may comprise a material selected from the group comprising metal materials.

In particular, in embodiments, the base plate may comprise a material selected from the group comprising copper, stainless steel, and titanium.

Hence, the base plate and the first plate and the second plate may in embodiments comprise, especially consist, of a thermally conductive material. Two or more may comprise the same thermally conductive material but also two or more may comprise different thermally conductive materials. A thermally conductive material may especially have a thermal conductivity of at least about 20 W/m/K, like at least about 30 W/m/K, such as at least about 100 W/m/K, like especially at least about 200 W/m/K. In yet further specific embodiments, a thermally conductive material may especially have a thermal conductivity of at least about 10 W/m/K. In embodiments, the thermally conductive material may comprise of one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide. It is especially referred to the above-mentioned materials in relation to the base plate and the first plate and the second plate.

In further embodiments, the vapor chamber assembly may comprise n sections and n−1 bends, wherein each two adjacent sections define one of the n−1 bends, wherein n is selected from the range of 2-10, especially from the range of 2-6, such as from the range of 2-4. In further embodiments, $n \geq 2$, such as $n \geq 3$, especially $n \geq 4$. In further embodiments, $n \leq 10$, such as $n \leq 6$, especially $n \leq 4$, such as $n \leq 3$, especially $n=3$, or especially $n=2$.

It will be clear to the person skilled in the art that the aforementioned types of bend may also be combined in a vapor chamber assembly, i.e., the vapor chamber assembly may comprise a vapor chamber element defined by two or more vapor chamber element parts, wherein the vapor chamber element is arranged along a bend, as well as a vapor chamber element that is comprised by a (single) section, wherein the vapor chamber element is separated from another vapor chamber element by a bend, especially a bend provided by a bent base plate.

In embodiments, the vapor chamber element may further comprise bridging elements bridging at least part of the first height (H1). The bridging elements may provide support to the vapor chamber element, especially to the chamber. In particular, in embodiments, the bridging elements may connect the first plate and the second plate, thereby improving the stability (or "rigidity") of the vapor chamber element. In embodiments, the bridging elements may especially comprise (supporting) columns. In embodiments, the columns are solid (i.e., not hollow). In yet other embodiments, the columns may be hollow.

In embodiments, the bend may have a bending radius $r_b$, especially an inner bending radius, or especially an outer bending radius, wherein the bending radius $r_b \leq 3$ mm, such as $\leq 2$ mm, especially $\leq 1.5$ mm, such as $\leq 1$ mm.

The term "bending radius" may herein especially refer to the radius of the circle best approximating a bend. The bend may especially correspond to at least 10% of the circumference of the circle, such as to at least 20%, especially at least 45%. In specific embodiments, the bend may correspond to about 25% of the circumference of a circle, i.e., the vapor chamber element may be bent at a bending angle $\alpha_b$ of about 90°. In further embodiments, the bend may correspond to about 50% of the circumference of a circle, i.e., the vapor chamber element may be bent at a bending angle $\alpha_b$ of about 180°. Especially, the bent may be over e.g. 45° or 90° or 180°, though other angles may also be possible. Upon bending of a plate-shaped element, the plate may provide an inner bend and an outer bend, wherein the outer band may have a (slightly) bigger bending radius, especially dependent on the thickness of the plate-shaped element. Hence, the bending radius may especially refer to an inner bending radius. In yet further specific embodiments, the term "bending radius" may especially refer to an outer bending radius.

Hence, in embodiments, the vapor chamber element may be bent at the bending section, wherein the bending section has a bending radius $r_b$, wherein the bending radius $r_b \leq 2$ mm.

In embodiments, the bridging elements may bridge at least 50% of the first height H1, such as at least 70% of the first height, especially at least 90%, including 100%. In particular, the bridging elements may connect the first plate and the second plate, i.e., the first plate and the second plate may (at least) be connected via the bridging elements. Hence, the bridging elements may have heights of at least 0.5*H1, more especially at least 0.7*H1, yet even more especially at least about 0.9*H1. In embodiments, the bridging elements are metal bridging elements. For instance, the bridging elements may be copper elements. Alternatively or additionally, the bridging elements may be ceramic bridging elements. Alternatively or additionally, the bridging elements may be plastic bridging elements. It will be clear to the person skilled in the art that the plastic bridging elements would comprise a plastic that has a suitable glass transition temperature (for use in a vapor chamber) and that would (essentially) not react with the liquid in the vapor chamber. In further embodiments, the bridging elements may comprise (metal) columns. In particular, the columns may have a cross-sectional shape selected from the group consisting of a sphere, a plate, and a cylinder. However, other shapes may also be possible.

In further embodiments, the bridging elements may have an equivalent circular diameter selected from the range of about $0.8{*}H_1$–$H_1$. The equivalent circular diameter (or ECD) of an (irregularly shaped) two-dimensional shape is the diameter of a circle of equivalent area. For instance, the equivalent circular diameter of a square with side a is $2{*}a{*}SQRT(1/\pi)$. For a circle, the diameter is the same as the equivalent circular diameter. Would a circle in an xy-plane with a diameter D be distorted to any other shape (in the xy-plane), without changing the area size, than the equivalent circular diameter of that shape would be D. However, the bridging elements may also have cross-sections having larger equivalent circular diameters, such as selected from the range of about $0.8{*}H_1$–$H_1$. Especially, the bridging elements may have cross-sections having equivalent circular diameters equal to or smaller than about 0.2*W1, even more especially at maximum 0.05*W1.

In embodiments, the bridging elements are provided by a corrugated element. Hence, in embodiments the vapor chamber may enclose an element, such as a corrugated element, which may consist of the bridging elements or which may consist of bridging elements and connector elements between the bridging elements. In specific embodiments, the bridging elements are connected elements which may form a corrugated structure. The bridging elements may be interconnected. The bridging elements may be configured in a 1D or 2 D array.

In further embodiments, the chamber may comprises a wick structure. In particular, the chamber, especially the wick structure, may comprise a first wick structure associated with the first plate, especially arranged in physical contact with the first plate, and/or a second wick structure associated with the second plate, especially arranged in physical contact with the second plate. Especially, the bridging elements may in embodiments thus extend from the wick structure. For instance, in embodiments the wick structure(s) may have a height of at maximum 0.4*H1, such as at maximum 0.25*H1. In further embodiments, the wick structure may comprise (at least part of) the bridging elements, i.e., the bridging elements may at least partly be comprised by the wick structure.

In a second aspect, the invention may further provide an (unbent) vapor chamber segment. The vapor chamber segment may comprise at least part of a vapor chamber element. The vapor chamber segment may have a segment thickness $d_s$, especially an average thickness, or a median thickness, perpendicular to an axis of elongation (A) (of the vapor chamber segment). In embodiments, the vapor chamber segment may comprise a thinned region having a (smallest) thickness dr, wherein $d_T \leq 0.5{*}d_s$, such as $d_T \leq 0.4{*}d_s$, especially $d_T \leq 0.3{*}d_s$, such as $d_T \leq 0.2{*}d_s$ especially $d_T \leq 0.15{*}d_s$, such as $d_T \leq 0.1{*}d_s$. In further embodiments, $d_T \geq 0.01{*}d_s$, such as $d_T \geq 0.05{*}d_s$, especially $d_T \geq 0.1{*}d_s$, such as $d_T \geq 0.15{*}d_s$, especially $d_T \geq 0.2{*}d_s$, such as $d_T \geq 0.3{*}d_s$.

The vapor chamber segment may be suitable to provide the vapor chamber assembly according to the invention.

In particular, in embodiments, two or more vapor chamber segments may be combined to provide a vapor chamber assembly. In such embodiments, the vapor chamber segment may essentially correspond to a section of the vapor chamber assembly.

In further embodiments, a vapor chamber segment may be bent to provide a vapor chamber assembly. In such embodiments, the vapor chamber segment may essentially correspond to a plurality of sections of the vapor chamber assembly.

In further embodiments, a vapor chamber assembly may be provided by both bending and combining vapor chamber segments, such as by bending a first vapor chamber segment (to provide two sections) and to connect the first vapor chamber segment to a second vapor chamber segment (especially thereby providing a third section).

In embodiments, the thinned region may be arranged at a first end of the vapor chamber segment with respect to the axis of elongation (A), especially wherein the vapor chamber segment tapers towards the first end. The tapering may especially provide a triangular shape at the end of the vapor chamber segment. In particular, the vapor chamber segment may taper at a taper angle $\alpha_t$, wherein the taper angle is especially the angle of the tip of the triangular shape at the first end. In embodiments, the taper angle $\alpha_t$ may be selected from the range of 5°-85°, especially from the range of 15°-75°, such as from the range of 30°-60°.

In such embodiments, the vapor chamber assembly may be provided by connecting two such vapor chamber segments, especially wherein the two vapor chamber segments taper at the same taper angle.

In embodiments, the vapor chamber segment, especially the at least part of a vapor chamber element, may comprise a groove, especially a V-shaped groove. The groove may especially be arranged at the thinned region, i.e., the groove may define the (location of the) thinned region.

In such embodiments, the vapor chamber assembly may be provided by bending the vapor chamber segment such that the groove is closed. For example, the vapor chamber segment may comprise a first plate comprising first plate parts, wherein the first plate consists of a single piece, and a second plate comprising two second plate parts, wherein the second plate parts are separated by the groove. The vapor chamber assembly may then be provided by bending the vapor chamber segment such that the second plate parts are connected (or "abutted"). The two second plate parts may, for example, be welded together after being connected.

It will be clear to the person skilled in the art that in such embodiments the vapor chamber segment may be designed to provide a desired bending angle and bending radius. In particular especially the depth of the groove and/or the width of the groove may define the bend that may be obtained.

In embodiments, the vapor chamber segment may comprise a plurality of vapor chamber elements (sequentially) arranged on a base plate along the axis of elongation (A). In further embodiments, two neighboring vapor chamber elements may be separated by a bending region of the base plate, especially wherein the bending region has a bending length $l_b$ along the axis of elongation (A). In further embodiments, $l_b$ is selected from the range of 0.1-40 mm. The bending region may especially comprise the thinned region. For example, in further embodiments, the bending region may comprise a groove, especially a V-shaped groove.

In particular, the bending region may be devoid of a part of a vapor chamber element. Hence, the thickness of the bending region may be primarily, especially solely, defined by the thickness of the base plate.

In further embodiments, the vapor chamber segment may comprise a plurality of bending regions, such as 2, 3 or 4 bending regions.

In such embodiments, the vapor chamber assembly may be provided by bending the vapor chamber segment at the bending region(s).

In a further aspect, the invention may provide a method of providing the vapor chamber assembly from the vapor chamber segment. In particular, the method may comprise bending of the vapor chamber segment and/or connecting a plurality of vapor chamber segments, especially at least bending of the vapor chamber segment, or especially at least connecting of a plurality of vapor chamber segments.

In particular, the method may comprise closing of a vapor chamber element (of the one or more vapor chamber elements), especially after bending or connecting of the vapor chamber segment(s). The closing of the vapor chamber element may especially leave a single opening for filling of the vapor chamber with a liquid, especially a coolant. Hence, the method may further comprise filling the vapor chamber assembly, especially the one or more vapor chamber elements, with a liquid, especially a coolant. In particular, the method may comprise filling the vapor chamber element after bending/connecting of the vapor chamber segment(s), and especially after closing of the vapor chamber element (especially by welding). After filling of the vapor chamber element, the vapor chamber element may be sealed. Hence, in further embodiments, the method may comprise sealing of the vapor chamber element.

In a further aspect the invention provides a vapor chamber assembly obtainable with the method of the invention.

In a further aspect the invention provides a device comprising the vapor chamber assembly of the invention.

In embodiments, the device may further comprise an electronic component. The electronic component may especially be thermally coupled, especially directly physically coupled (i.e. in physical contact), to the vapor chamber assembly. In particular, the vapor chamber assembly, especially the vapor chamber element, may be arranged in thermal coupling with the electronic component in order to cool the electronic component, i.e., the vapor chamber assembly, especially the vapor chamber element, may be configured in a heat exchanging relationship with the electronic component. In embodiments, one or more vapor chamber elements may be configured at one side of the base plate and the electronic component may be configured at another side of the base plate (in thermal contact therewith).

Especially, the term "thermal contact" may indicate that an element can exchange energy through the process of heat with another element. In embodiments, thermal contact may be achieved between two elements when the two elements are arranged relative to each other at a distance of equal to or less than about 10 μm, though larger distances, such as up to 100 μm may be possible. The shorter the distance, the better the thermal contact. Especially, the distance is 10 μm or less, such as 5 μm or less. The distance may be the distance between two respective surfaces of the respective elements. The distance may be an average distance. For instance, the two elements may be in physical contact at one or more, such as at a plurality, of positions, while at one or more, especially at a plurality, of other positions the elements are not in physical contact. For instance, this may be the case when one or both elements have a rough surface. Hence, in embodiments in average the distance between the two elements may be 10 μm or less (though larger average distances may be possible, such as up to 100 μm). In embodiments, the two surfaces of the two elements may be kept at a distance with one or more distance holders.

Herein, the term "thermal contact" may especially refer to an arrangement of elements that may provide a thermal conductivity of at least about 10 W/mK, such as at least 20 W/mK, such as at least 50 W/mK. In embodiments, the term "thermal contact" may especially refer to an arrangement of elements that may provide a thermal conductivity of at least about 150 W/mK, such as at least 170 W/mK, especially at least 200 W/mK. In embodiments, the term "thermal contact" may especially refer to an arrangement of elements that may provide a thermal conductivity of at least about 250 W/mK, such as at least 300 W/mK, especially at least 400 W/mK.

In embodiments, the device may comprise a housing. In particular, the housing may comprise the vapor chamber assembly, and especially the electronic component.

In further embodiments, the housing may internally have a rounded corner, especially wherein the rounded corner is configured for hosting the (bending section of) the vapor chamber assembly. In particular, the bending section of the vapor chamber assembly may be arranged in physical contact with the rounded corner at a contact interface, especially wherein the bending section and the rounded corner have (essentially) the same radius at the contact interface. Thereby, the vapor chamber assembly and the housing may efficiently exchange heat, also at the corner of the housing. Otherwise, air may be trapped between the housing and the vapor chamber assembly, which may inhibit efficient heat exchange at the corner. Further, the rounded corner may provide increased stability to the device, as the vapor chamber assembly is spatially constrained in such embodiments.

Similarly, in further embodiments, the housing may internally have a sharp corner, especially wherein the sharp corner is configured for hosting the (bend of) the vapor chamber assembly. In particular, the vapor chamber assembly and the sharp corner may have (essentially) the same shape at the contact interface. Thereby, the vapor chamber assembly and the housing may efficiently exchange heat, also at the corner of the housing. Otherwise, air may be trapped between the housing and the vapor chamber assembly, which may inhibit efficient heat exchange at the corner. Further, the sharp corner may provide increased stability to the device, as the vapor chamber assembly is spatially constrained in such embodiments.

In further embodiments, the device may comprise a plurality of vapor chamber assemblies.

In specific embodiments, the device may comprise a light generating device. The light generating device comprises one or more light sources. Especially, in embodiments the one or more light sources comprise solid state light sources. For instance, the one or more light sources may comprise LEDs. The one or more light sources are configured to generate light source light, such as in embodiments LED light. The light generating device is especially configured to generate device light, especially comprising light of the one or more light sources, or especially consisting of the light of the one or more light sources. In embodiments, the device light may be white light. Would the spectral power distribution of the device light be controllable, then the device light may be white light in one or more operational modes of the light generating device. The term white light is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL. In particular, the light generating device may comprise an LED light generating device. For instance, the LED light generating device may be physically coupled to the vapor chamber assembly, especially to the vapor chamber element. In a specific embodiment, the light source comprises a solid state LED light source (such as a LED or laser diode). The term "light source" may also relate to a plurality of light sources, such as 2-20 (solid state) LED light sources. Hence, the term LED may also refer to a plurality of LEDs.

In further specific embodiments, the device may comprise a driver unit comprising a driver, wherein the driver is thermally coupled with the bent vapor chamber element. For instance, the driver may be physically coupled to the vapor chamber element. The light generating device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD backlighting.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1A:
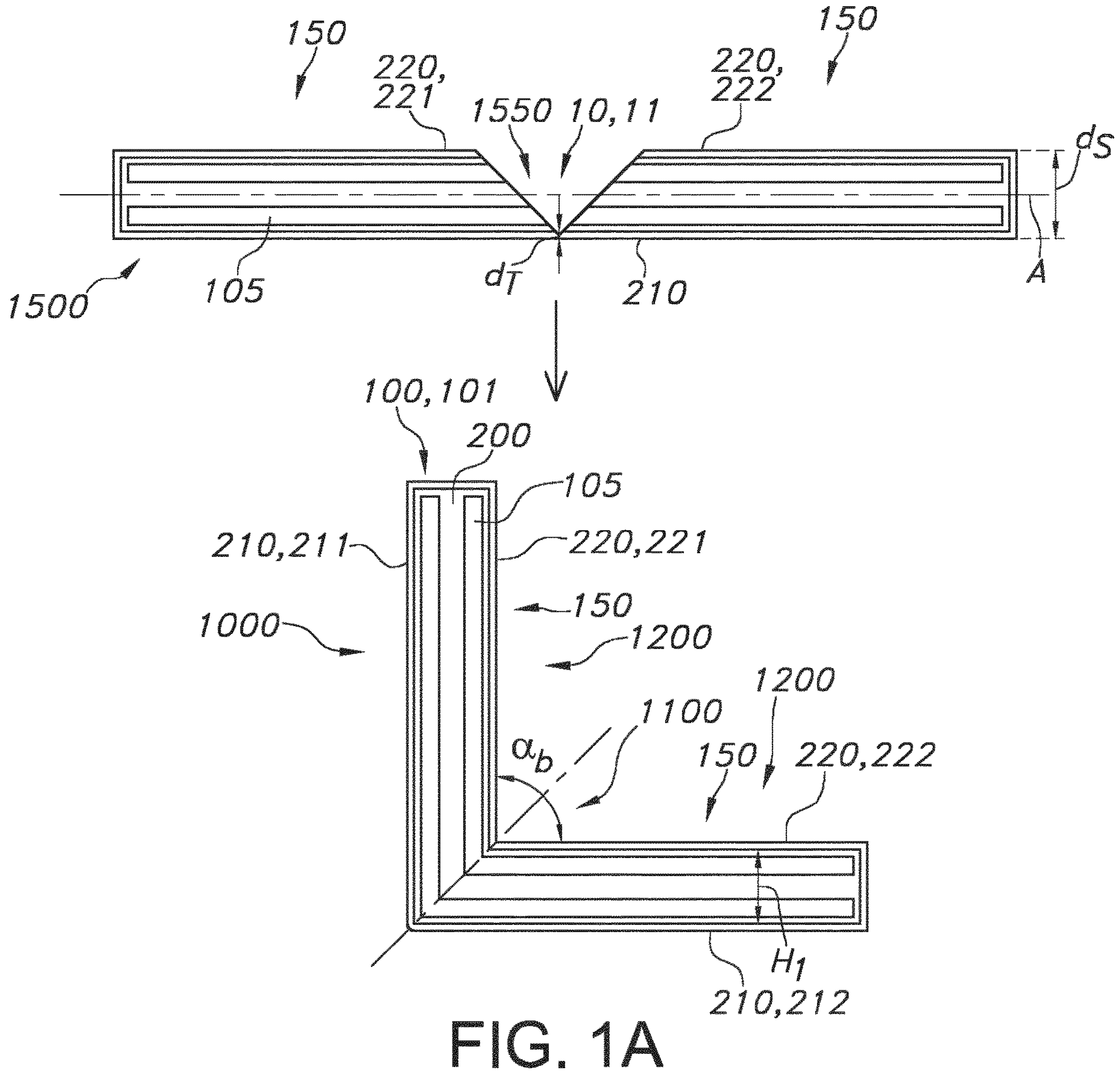
FIG. 1A-B schematically depict an embodiment of the vapor chamber assembly and an embodiment of the vapor chamber segment.

FIG. 1A schematically depicts an embodiment of the vapor chamber assembly 1000 (bottom half of figure). In particular, the vapor chamber assembly 1000 comprises two sections 1200 and one or more vapor chamber elements 100. For visualization purposes, the two sections 1200 have been separated by a hyphened line. In particular, in the depicted embodiment, the vapor chamber assembly comprises a single vapor chamber element 100. Each section 1200 may comprise at least part of the one or more vapor chamber elements 100. Here, both sections 1200 comprise about half of the vapor chamber element 1000. Each vapor chamber element 100 may comprise a vapor chamber 200 at least partly defined by two parallel configured plate parts 211,221. In the depicted embodiment, the two sections 1200 define a bend 1100, wherein the bend 1100 has a bend angle $\alpha_b$, wherein $0° \leq \alpha_b < 180°$, especially wherein $5° \leq \alpha_b \leq 135°$.

Hence, in the depicted embodiment, the two sections 1200 together define at least part of (a single) one of the one or more vapor chamber elements 100. Hence, the vapor chamber element may be a shared vapor chamber element 101, i.e., the two sections 1200 together define at least part of a shared vapor chamber element 101 of the one or more vapor chamber elements 100.

The vapor chamber element 100 may comprise a vapor chamber 200 at least partly defined by two parallel configured plates 210,220, i.e., in embodiments, the vapor chamber element 100 may comprise a first plate 210 and a second plate 220, especially with a vapor chamber 200 in between. The first plate 210 and the second plate 220 may especially be arranged in parallel. Hence, in embodiments, the vapor chamber may be defined by at least a first plate 210 and a second plate 220 having an average plate distance equal to a first height H1, i.e., the first plate 210 and the second plate 220 may define the first height H1.

The bend angle $\alpha_b$ may especially be defined as the angle between section planes of the two sections, wherein each section plane is essentially parallel to the respective section. In particular, the bend angle $\alpha_b$ may be defined as the angle between the first plate parts 211,212 corresponding to the two sections 1200, or the angle between the second plate parts 221, 222 corresponding to the two sections 1200. In general, the angle between the first plate parts 211,212 may be about the same angle as the angle between the second plate parts 221, 222.

Hence, in embodiments, the two sections may each comprise a first (or second) plate part, wherein the bend angle $\alpha_b$ is the angle between the two first (or second) plate parts.

In the depicted embodiment, the two sections 1200 comprise a vapor chamber element part 150, wherein the vapor chamber element parts 150 taper towards the bend 1100.

In particular, the vapor chamber 200 is at least partly defined by two plates 210,220, wherein a first plate 210 of the two plates 210,220 consists of a single piece comprising two first plate parts 211, 212, and wherein a second plate 220 of the two plates 210,220 comprises two second plate parts 221,222 abutted at the bend 1100. Further, in the depicted embodiment, each of the first plate parts 211,212 is configured in parallel with one of the second plate parts 221,222, i.e., first plate part 211 is configured in parallel with second plate part 221, and first plate part 212 is configured in parallel with second plate part 222.

FIG. 1A further schematically depicts an embodiment of the vapor chamber segment 1500. In particular, the vapor chamber segment 1500 may comprise at least part of a vapor chamber element 100. The vapor chamber segment 1500 may have an average segment thickness $d_s$ perpendicular to an axis of elongation A. In embodiments, the vapor chamber segment 1500 may further comprise a thinned region 1550 having a thickness dr, wherein $d_T \leq 0.5 * d_s$.

In particular, in the depicted embodiment, the vapor chamber segment 1500 comprises a groove 10, especially a V-shaped groove 11.

Figure 1B:
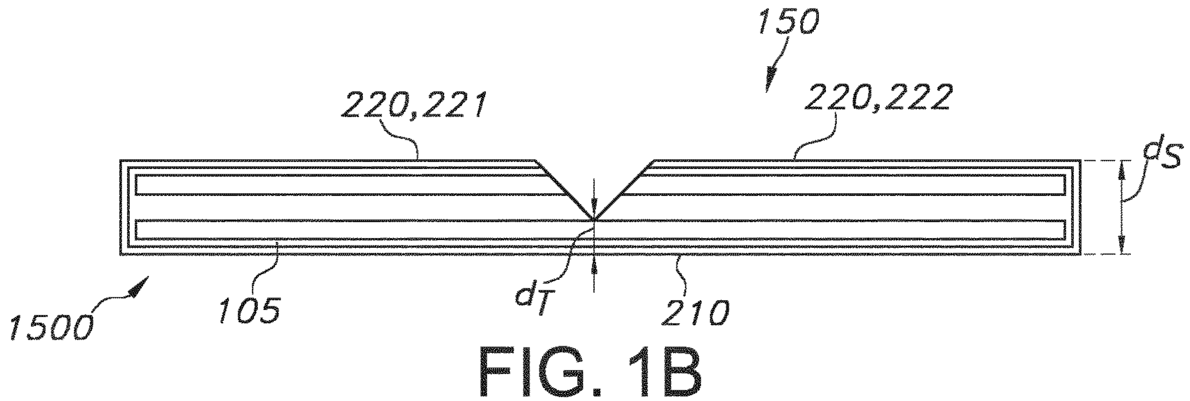

Hence, in the depicted embodiment, the thickness $d_T$ of the thinned region may essentially be the thickness $d_1$ of the first plate 210. In further embodiments, the thickness dr of the thinned region may be less than the thickness $d_1$, for example $0.5 * d_1$, or may be more than the thickness $d_1$. For example, the groove 10 may run till the wick 105 closest to the first plate 210, such as schematically depicted in FIG. 1B, especially such that the wick 105 is uninterrupted. In such embodiments, the wick 105 may especially comprise a mesh wick.

The vapor chamber assembly 1000 of FIG. 1A may especially be provided from the vapor chamber segment 1500 of FIG. 1A by bending the vapor chamber segment 1500 such that the groove 1500 is closed.

Figure 2A:
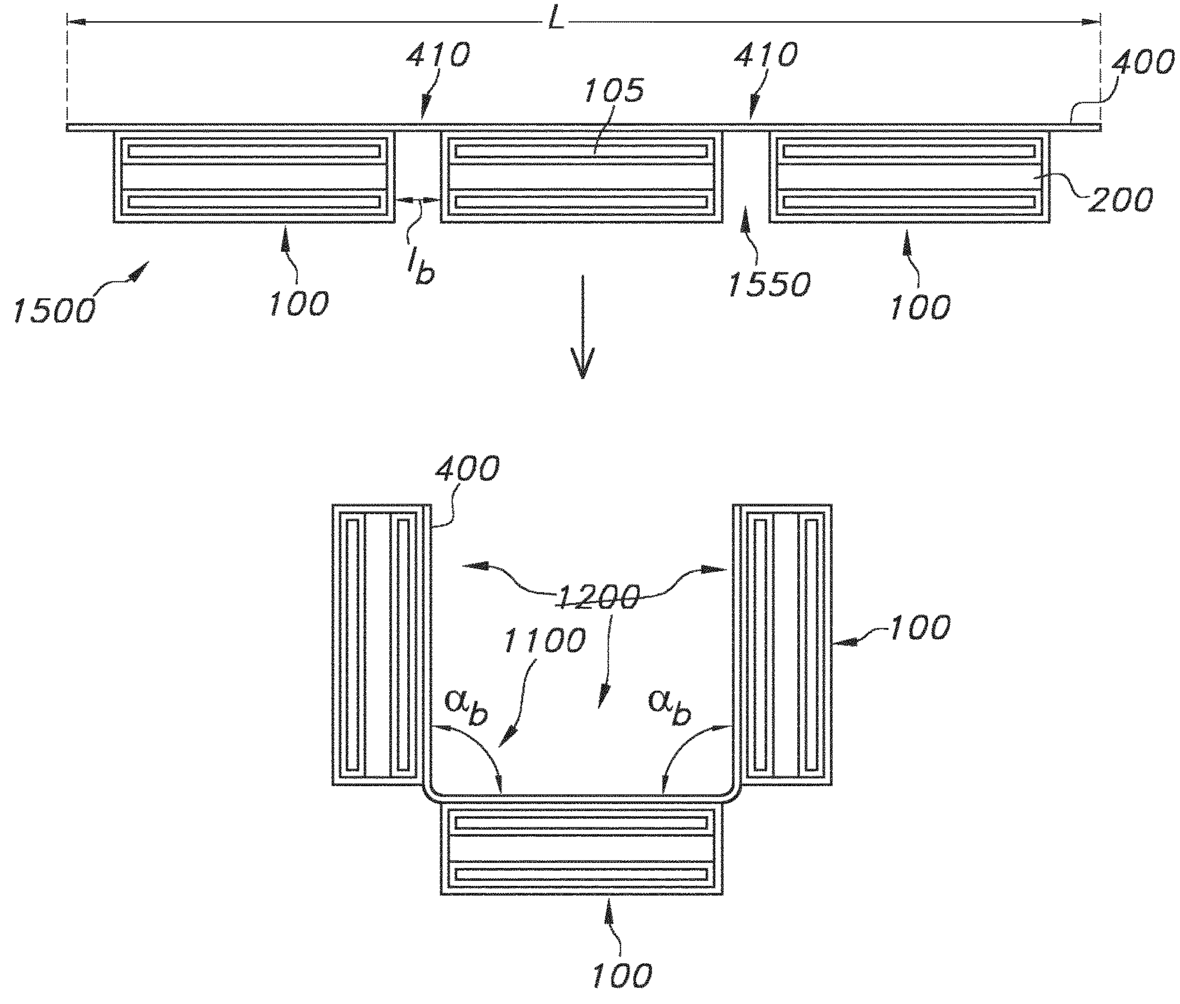
FIG. 2A-C schematically depict a further embodiments of the vapor chamber assembly and the vapor chamber segment.

FIG. 2A schematically depicts a further embodiment of the vapor chamber assembly 1000. In the depicted embodiment, the vapor chamber assembly 1000 comprises a base plate 400. Further, the vapor chamber assembly 1000 comprises a plurality of vapor chamber elements 100 arranged on the base plate 400 along a base plate length L, wherein two neighboring vapor chambers elements 100 are separated by the bend 1100.

In embodiments, the two neighboring vapor chamber elements 100 may be separated by a bending region 410 of the base plate 400. The bending region 410 may have a bending length $l_b$ along the base plate length L, especially wherein $l_b$ is selected from the range of 0.1-40 mm. The bending length $l_b$ may especially be the (shortest) distance (before bending) between the two neighboring vapor chamber elements 100 that are separated by the bend 1100.

FIG. 2A further schematically depicts an embodiment of the vapor chamber segment 1500. In the depicted embodiment, the vapor chamber segment 1500 comprises a plurality of vapor chamber elements 100 sequentially arranged on a base plate 400 along the axis of elongation A. Hence, a plurality of vapor chamber elements 100 are arranged in series on a base plate 400 parallel to an axis of elongation A. In particular, two neighboring vapor chamber elements 100 may be separated by a bending region 410 of the base plate 400, wherein the bending region 410 has a bending length $l_b$ along the axis of elongation A, wherein $l_b$ is selected from the range of 0.1-40 mm, and especially wherein the bending region 410 comprises the thinned region 1550.

Hence, the vapor chamber assembly 1000 of FIG. 2A may be provided from the vapor chamber segment 1500 of FIG. 2A by bending the vapor chamber segment 1500 at the bending regions 410.

Figure 2B:
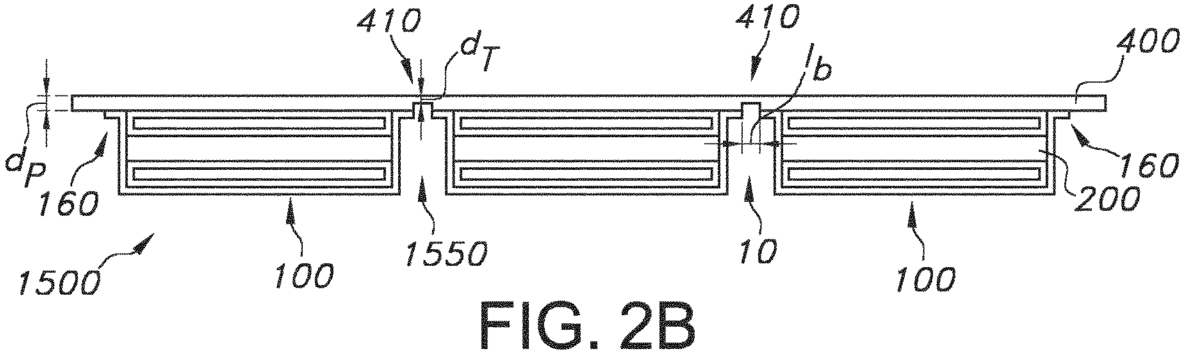

FIG. 2B schematically depicts a further embodiment of the vapor chamber segment 1500. In the depicted embodiment, the base plate 400 has a thickness $d_p$, especially an average thickness $d_p$, or especially a median thickness $d_p$, wherein the bending region 410 comprises a thinned region 1550 having a thickness dr, wherein $d_p$ is selected from the range of 0.05-2 mm, and wherein $0.1 \leq d_T/d_p \leq 0.9$. Hence, the base plate 400, especially the bending region 410, may comprise a groove 10 defining the thinned region 1550.

Further, in the depicted embodiment, the vapor chamber element 100 comprises a flange 160 for attaching of the vapor chamber element 100 to the base plate 400. Especially, each vapor chamber element 100 may comprise a flange 160 on either end of the vapor chamber element 100 with respect to the base plate length L. In particular, the flange 160 may be welded to the base plate 400. Hence, in such embodiments, the bending region 410 may especially be arranged between the flanges 160 of neighboring vapor chamber elements 100.

Figure 2C:
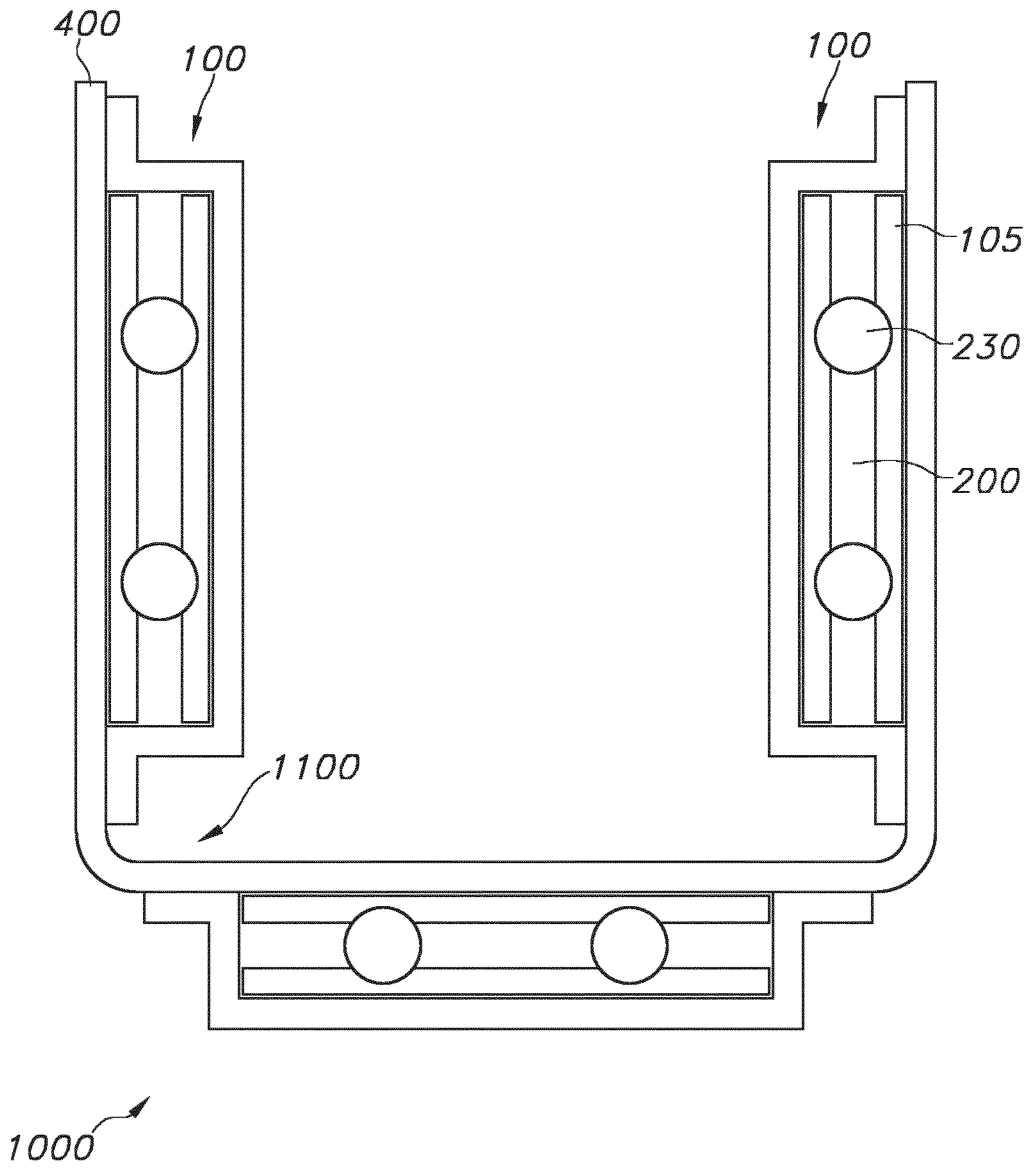

FIG. 2C schematically depicts a further embodiment of the vapor chamber assembly 1000. In the depicted embodiment, the vapor chamber elements 100 are arranged at different sides of the base plate 400. Hence, in embodiments, the vapor chamber elements 100 may be arranged at opposite sides of the base plate 400.

In further embodiments, the vapor chamber elements 100 may all be arranged at the same side of the base plate 400.

Figure 3:
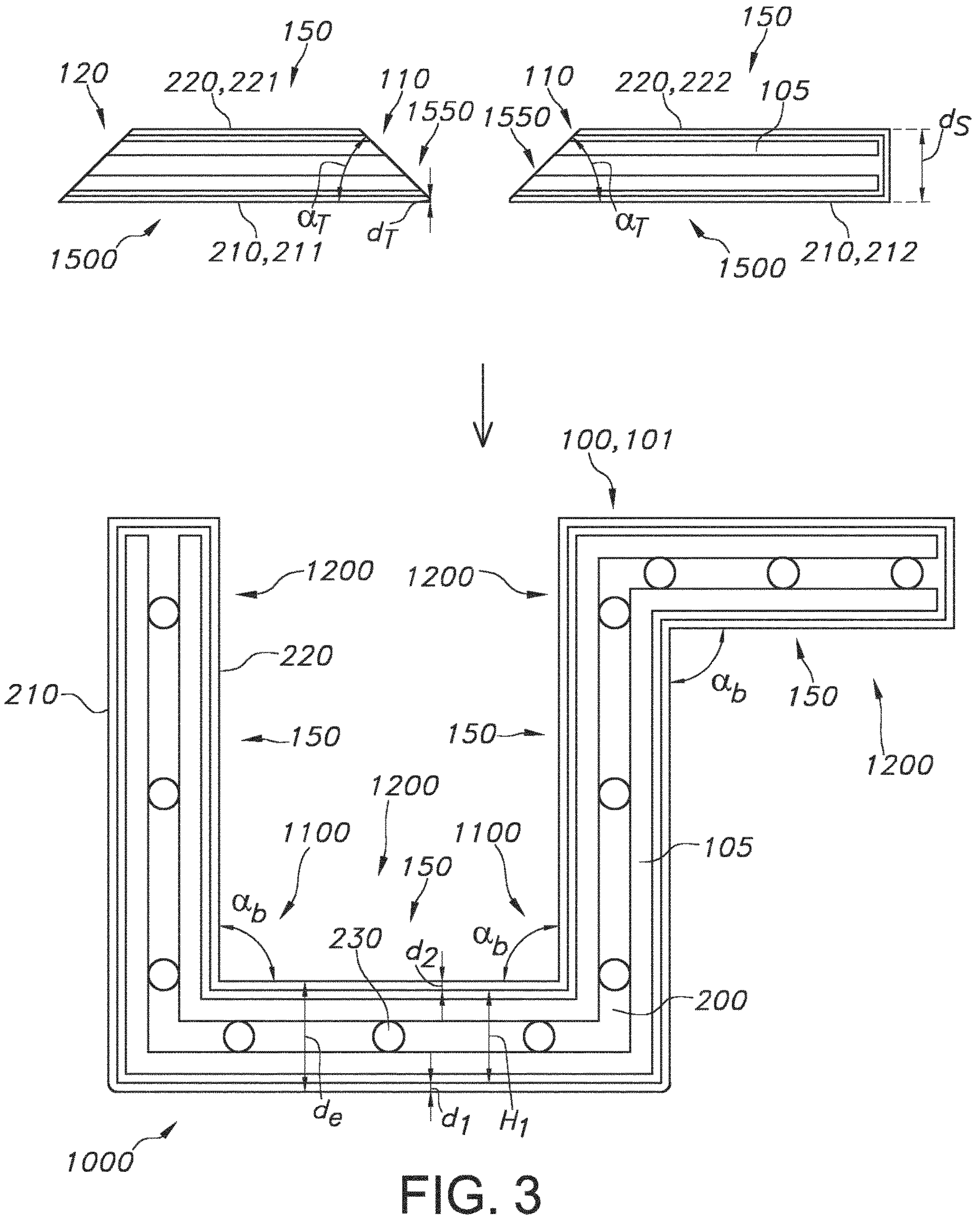
FIG. 3 schematically depicts a further embodiment of the vapor chamber assembly and a further embodiment of the vapor chamber segment.

FIG. 3 schematically depicts a further embodiment of the vapor chamber assembly 1000. In the depicted embodiment, each of the (at least) two sections 1200 comprises a vapor chamber element part 150, wherein the vapor chamber element parts 150 taper towards the bend 1100, and wherein the vapor chamber element parts 150 define at least part of the one of the one or more vapor chamber elements 100. In the depicted embodiment, $\alpha_b \geq 45°$. In particular, $\alpha_b$ is about 90°. Further, in the depicted embodiment, the vapor chamber 200 is at least partly defined by two plates 210,220, wherein a first plate 210 of the two plates 210,220 comprises two first plate parts 211, 212 abutted at the bend 1100, and wherein a second plate 220 of the two plates 210,220 comprises two second plate parts 221,222 abutted at the bend 1100. Further, in the depicted embodiment, each of the first plate parts 211,212 is configured in parallel with one of the second plate parts 221,222, i.e., first plate part 211 is configured in parallel with second plate part 221, and first plate part 212 is configured in parallel with second plate part 222.

In the depicted embodiment, the vapor chamber element 100 is defined by three sections 1200 of the vapor chamber assembly 1000.

In embodiments, the two parallel configured plates 210, 220 define a vapor chamber height H1, wherein the vapor chamber 200 comprises bridging elements 230 bridging at least part of the vapor chamber height H1. In the depicted embodiment, the bridging elements 230 may especially have a spherical shape.

FIG. 3 further schematically depicts two embodiments of the vapor chamber segment 1500. In the depicted embodiments, the thinned region 1550 is arranged at a first end 110 of the vapor chamber segment 1500 with respect to the axis of elongation A, wherein the vapor chamber segment 1500 tapers towards the first end 110. The tapering may especially provide a triangular shape at the end of the vapor chamber segment 1500. In particular, the vapor chamber segment 1500 may taper at a taper angle $\alpha_t$, wherein the taper angle $\alpha_t$ is especially the angle of the tip of the triangular shape at the first end 110. In embodiments, the taper angle or may be selected from the range of 5°-85°, especially from the range of 15°-75°, such as from the range of 30°-60°. In the depicted embodiment, the taper angle $\alpha_t$ may be about 45°.

In particular, in the embodiment depicted on the left, the vapor chamber segment 1500 comprises two thinned regions 1550, wherein a first thinned region 1500 is arranged at a first end 110 of the vapor chamber segment 1500 with respect to the axis of elongation, and wherein a second thinned region 1500 is arranged at a second end 120 of the vapor chamber segment 1500 with respect to the axis of elongation.

Hence, the vapor chamber assembly 1000 of FIG. 3 may be obtained from the vapor chamber segments 1500 of FIG. 3 (using both depicted embodiments twice) by connecting the vapor chamber segments 1500. In particular, the vapor chamber segments 1500 may be welded together. In particular, the vapor chamber assembly 1000 of FIG. 3 provides a vapor chamber element 100 wherein the two sections 1200 define a bend 1100, wherein the bend 1100 has a bend angle $\alpha_b$, wherein $0° \leq \alpha_b < 180°$, especially wherein $5° \leq \alpha_b \leq 135°$. However, the bend 1100 is provided by assembling the vapor chamber element parts 150 rather than by bending a vapor chamber element (part). Hence, in the depicted embodiment, the bend 1100 may be considered to have a bending radius (see below) of 0.

In the depicted embodiment, the first plate 210 and the second plate 220 may (respectively) have a first thickness ($d_1$) and a second thickness ($d_2$) independently selected from the range of 50-5000 μm, such as 100-2000 μm, like especially 300-2000 μm. The thicknesses of the first plate 210 and the second plate 220 and the space between the plates 210,220, especially the vapor chamber 200, may also essentially define the thickness of the vapor chamber element 100. Hence, in embodiments, the vapor chamber element 100 may have an element thickness $d_e$, wherein $d_e=d_1+d_2+H1$. In particular, the element thickness $d_e$ may be essentially the same as the segment thickness $d_s$ (see below).

Figure 4:
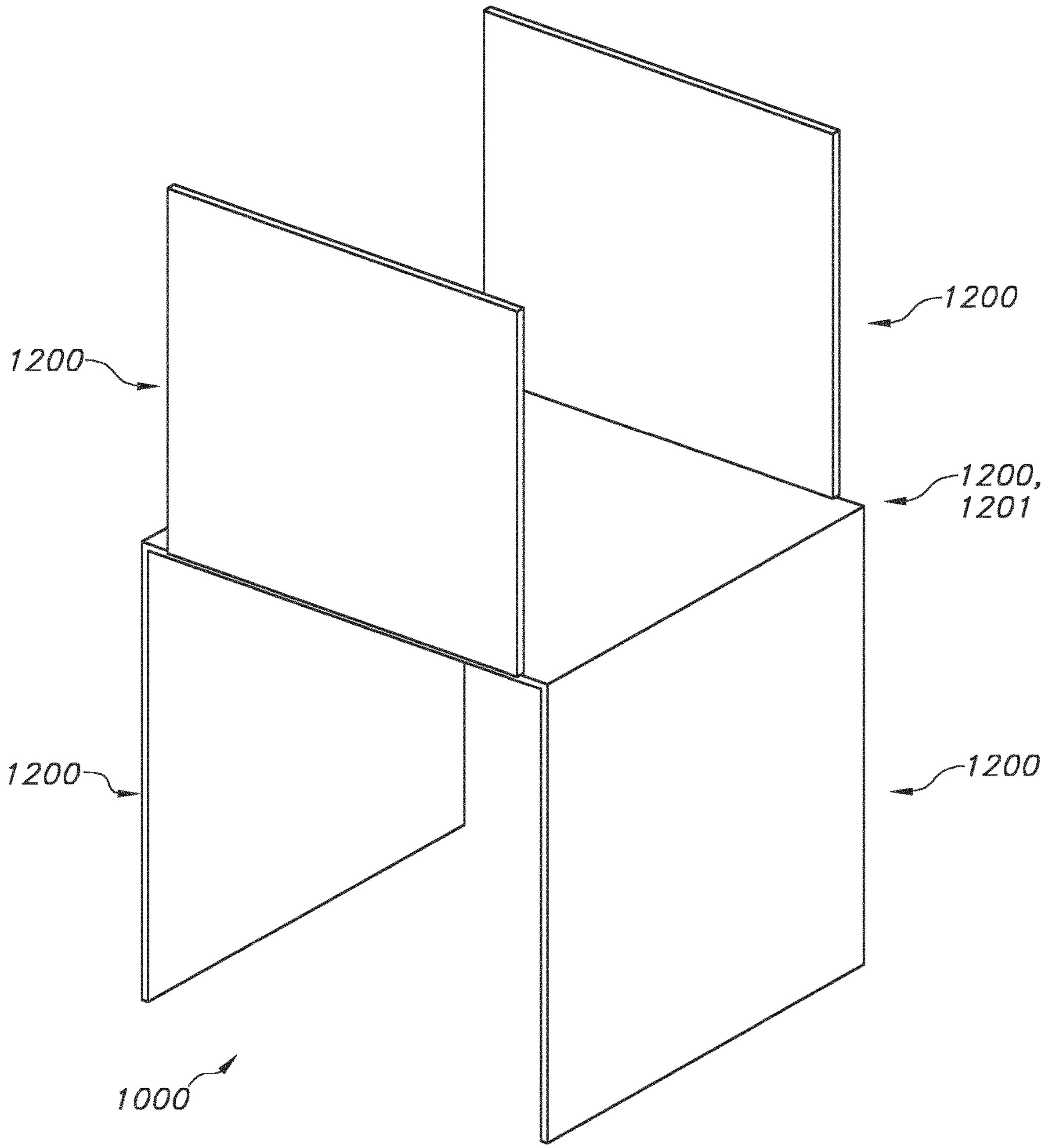
FIG. 4 schematically depicts a further embodiment of the vapor chamber assembly.

FIG. 4 schematically depicts a further embodiment of the vapor chamber assembly 1000. In the depicted embodiment, a rectangular central segment 1200, 1201 may provide (respective) bends with four other segments 1200. Similarly, the four other segments 1200 may again provide bends with one or more other segments 1200.

Similarly, a vapor chamber assembly 1000 may be functionally coupled to other elements, such as other cooling elements, especially at edges of the vapor chamber assembly 1000.

Figure 5A:
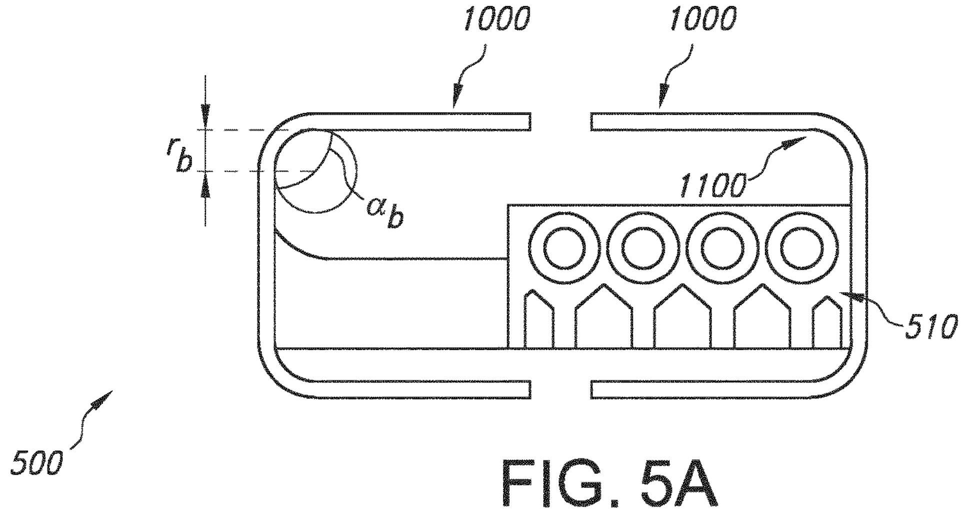
FIG. 5A-C schematically depict an embodiment of the device comprising a vapor chamber assembly.
Figure 5B:
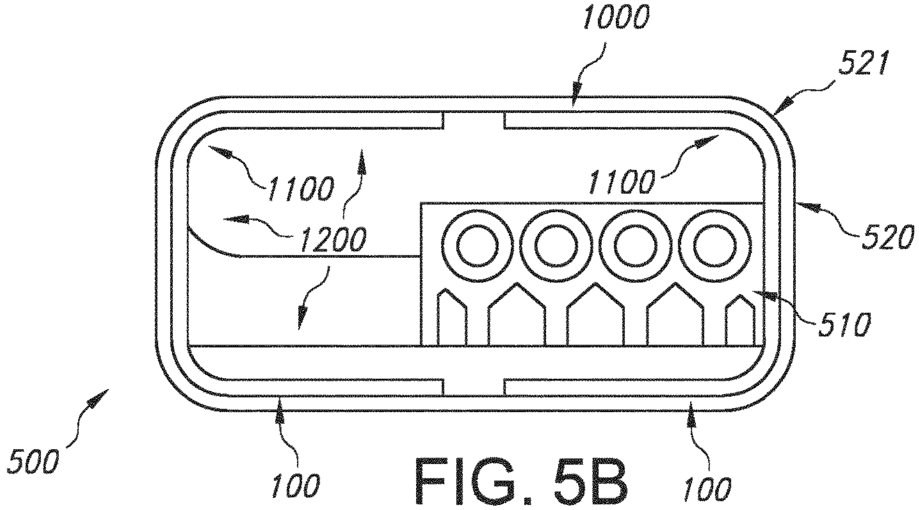
Figure 5C:
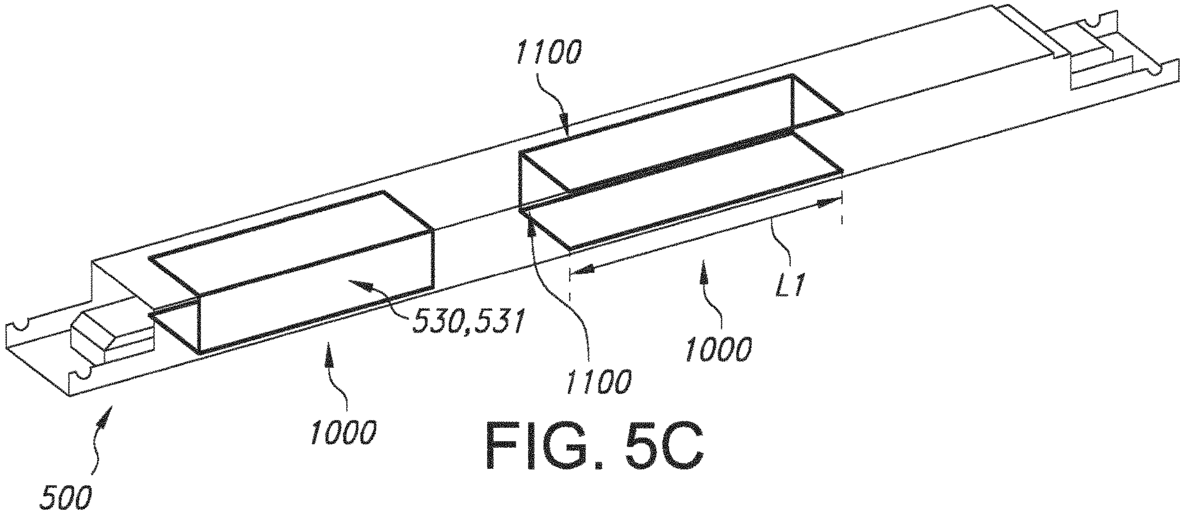

FIG. 5A-C schematically depict embodiments of the device 500 comprising a vapor chamber assembly 1000. In particular, FIG. 5A-C depict a device 500 comprising a (bent) vapor chamber assembly 1000, wherein the device 500 further comprises an electronic component 510 thermally coupled, especially directly physically coupled, to the vapor chamber assembly 1000.

FIG. 5A schematically depicts an embodiment of the device 500 wherein the device 500 comprises a plurality of vapor chamber assemblies 1000, especially two vapor chamber assemblies 1000. In particular, each of the depicted vapor chamber assemblies comprises n bends 1100, wherein n=2. In the depicted embodiment, the bend 1100 is bent at a bending radius $r_b$, wherein the bending radius $r_b \leq 2$ mm. In particular, the bending radius $r_b$ corresponds to the radius of a circle matching the circle section defined by the bending section (after bending). For explanatory purposes, a matching circle is depicted in FIG. 5A. Hence, the vapor chamber assembly 1000, especially the two sections 1200, may define a bend 1100, wherein the bend 1100 has a bending radius $r_b$, especially wherein $r_b \leq 2$ mm. In particular, in the depicted embodiment, the bending angle $\alpha_b$ may be about 90°.

FIG. 5B schematically depicts an embodiment of a device 500 comprising two single vapor chamber assemblies 1000, wherein each vapor chamber assembly 1000 comprises n bends 1100, wherein n=2.

In the depicted embodiment, the device 500 comprises a housing 520. The housing may comprise the vapor chamber assembly 1000 and the electronic component 510. In particular, in the depicted embodiment, the housing 520 internally has a rounded corner 521 (or: "has a rounded internal corner 521"), wherein the bend 1100 of the vapor chamber assembly 1000 is arranged in physical contact with the rounded corner 521 at a contact interface. In the depicted embodiment the bend and the rounded corner have (essentially) the same radius of curvature at the contact interface, i.e., there is (essentially) no empty space between the housing 520 and the vapor chamber assembly 1000 at the rounded corner 521. In particular, the rounded corner 521 is configured for hosting the bend 1100 of the vapor chamber assembly 1000, especially a vapor chamber assembly 1000 comprising a base plate 400.

Similarly, in further embodiments, the housing may internally have a sharp corner, especially wherein the sharp corner is configured for hosting the (bend of) the vapor chamber assembly 1000. In particular, the vapor chamber assembly 1000 and the sharp corner may have (essentially) the same shape at the contact interface. Thereby, the vapor chamber assembly 1000 and the housing may efficiently exchange heat, also at the corner of the housing. Otherwise, air may be trapped between the housing and the vapor chamber assembly 1000, which may inhibit efficient heat exchange at the corner. Further, the sharp corner may provide increased stability to the device 500, as the vapor chamber assembly is spatially constrained in such embodiments. In particular, the sharp corner may be configured for hosting the bend 1100 of the vapor chamber assembly 1000, especially a vapor chamber assembly 1000 wherein two sections 1200 together define at least part of one of the one or more vapor chamber elements 100.

FIG. 5C also schematically depicts an embodiment of the device 500 wherein the device 500 comprises a plurality of vapor chamber assemblies 1000, especially two vapor chamber assemblies 1000. In particular, in this embodiment, the vapor chamber assemblies 1000 may specifically be arranged at those areas of the device 500 where heat-generating elements are located.

Figure 6:
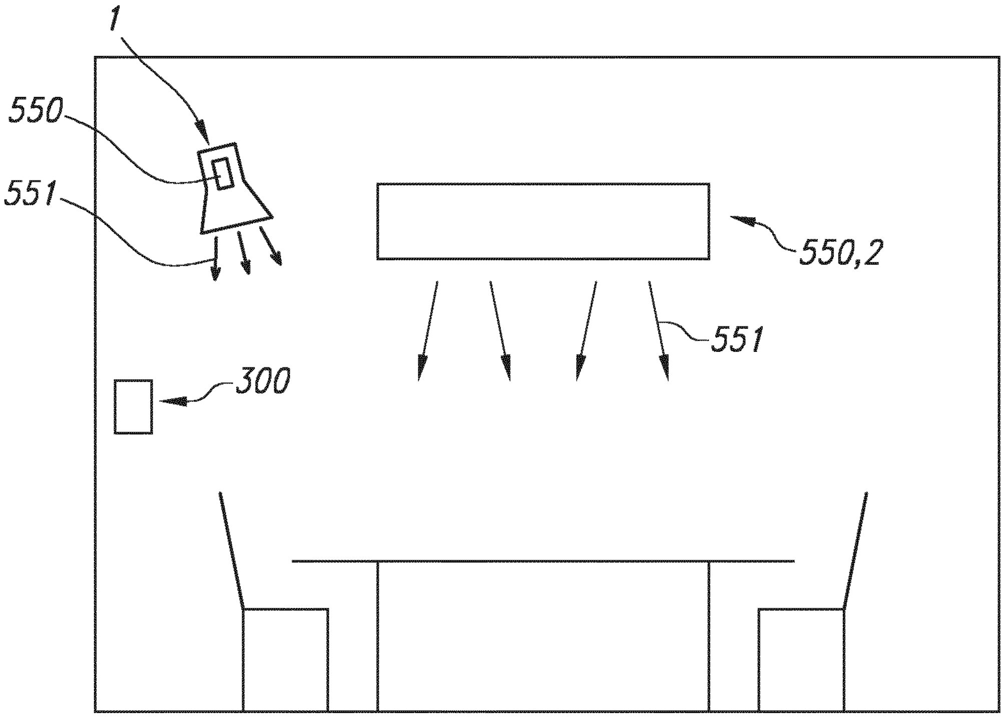
FIG. 6 schematically depicts embodiments of a luminaire and a lamp comprising the device of the invention.

FIG. 6 schematically depicts an embodiment of a luminaire 2 comprising a light generating device 550 comprising the device 500 described above. Reference 300 indicates a control system 300, especially a control system comprising a user interface. The control system 300 may especially be functionally coupled with the light generating device 550. FIG. 6 also schematically depicts an embodiment of a lamp 1 comprising the light generating device 550.

In embodiments, the device 500 may comprise a light generating device 550.

In further embodiments, the device 500 may comprises a driver unit 530 comprising a driver 531, wherein the driver 531 is thermally coupled with the vapor chamber assembly 1000, especially with the one or more vapor chamber elements 100.

The term "plurality" refers to two or more. Furthermore, the terms "a plurality of" and "a number of" may be used interchangeably.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. Moreover, the terms "about" and "approximately" may also relate to 90% or higher, such as 95% or higher, especially 99% or higher, even more especially 99.5% or higher, including 100%. For numerical values it is to be understood that the terms "substantially", "essentially", "about", and "approximately" may also relate to the range of 90%-110%, such as 95%-105%, especially 99%-101% of the values(s) it refers to.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

The term "further embodiment" and similar terms may refer to an embodiment comprising the features of the previously discussed embodiment, but may also refer to an alternative embodiment.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", "include", "including", "contain", "containing" and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings. Moreover, if a method or an embodiment of the method is described being executed in a device, apparatus, or system, it will be understood that the device, apparatus, or system is suitable for or configured for (executing) the method or the embodiment of the method, respectively.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A vapor chamber assembly comprising:

two sections and one or more vapor chamber elements, wherein each section comprises at least part of the one or more vapor chamber elements, wherein each vapor chamber element comprises a vapor chamber at least partly defined by two parallel configured plate parts, wherein the two sections define a bend, wherein the bend has a bend angle $\alpha_b$, wherein $\alpha_b$<180°;

wherein the two sections together define at least part of one of the one or more vapor chamber elements; and wherein each of the two sections comprises a vapor chamber element part, wherein the vapor chamber element parts taper towards the bend, and wherein the vapor chamber element parts define at least part of the one of the one or more vapor chamber elements, and wherein $\alpha_b$≥45°.

2. The vapor chamber assembly according to claim 1, wherein 45°≤$\alpha_b$≤135°.

3. The vapor chamber assembly according to claim 1, wherein the vapor chamber is at least partly defined by two plates, wherein a first plate of the two plates consists of a single piece comprising two first plate parts, and wherein a second plate of the two plates comprises two second plate parts abutted at the bend, wherein each of the first plate parts is configured in parallel with one of the second plate parts.

4. The vapor chamber assembly according to claim 1, wherein the two parallel configured plates define a vapor chamber height, wherein the vapor chamber comprises bridging elements bridging at least part of the vapor chamber height.

5. The vapor chamber assembly according to claim 1, wherein the bend has a bending radius ≤2 mm.

6. A device comprising the vapor chamber assembly of claim 1, wherein the device further comprises an electronic component thermally coupled to the vapor chamber assembly.

7. The device according to claim 6, wherein the device comprises a housing, wherein the housing internally has a rounded corner, wherein the bend of the vapor chamber assembly is arranged in physical contact with the rounded corner at a contact interface, wherein the bend and the rounded corner have the same radius at the contact interface.

8. The device according to claim 6, wherein the device comprises a light generating device.

9. The device according to claim 6, wherein the device comprises a driver unit comprising a driver, wherein the driver is thermally coupled with the vapor chamber assembly.

10. A lamp or a luminaire comprising the light generating device according to claim 8.

* * * * *